May 11, 1954  H. B. GREENWOOD  2,677,971
ANGULAR ADJUSTMENT DEVICE
Filed Jan. 6, 1953  2 Sheets-Sheet 1

INVENTOR
Henry B. Greenwood
BY Watson, Cole, Grindle & Watson
ATTORNEYS

May 11, 1954     H. B. GREENWOOD     2,677,971
ANGULAR ADJUSTMENT DEVICE
Filed Jan. 6, 1953

INVENTOR
Henry B. Greenwood
BY Watson, Cole, Grindle & Watson
ATTORNEYS

Patented May 11, 1954

2,677,971

UNITED STATES PATENT OFFICE 2,677,971

ANGULAR ADJUSTMENT DEVICE

Henry B. Greenwood, Baltimore, Md.

Application January 6, 1953, Serial No. 329,875

6 Claims. (Cl. 74—395)

This invention relates to rotary machines having operative shafts, cylinders or other rotating members, such as for example, printing machines, cutting or slotting devices, sheet or web feeders or the like; and the invention has to do more particularly with improvements in mechanism for shifting or adjusting such rotary members both axially and circumferentially of their mounting, as for the purpose of attaining or restoring proper registry with respect to other operative means incorporated in the same machine or in an associated instrumentality.

The general object of the invention is to provide a novel and improved device of the class described, and generically similar to the one disclosed in my prior United States Patent No. 1,868,385, granted July 19, 1932.

In its preferred embodiment, the invention contemplates the provision of registry means for a rotary member carried by a shaft mounted in bearings in the supporting framework of a machine, the bearing arranged to accommodate an adequate axial adjusting movement of the shaft as well as an indefinite rotary movement. The shaft is adapted to be driven by means of a driving gear which is mounted coaxially of the shaft but free of any permanently fixed keyed relationship with the shaft, whereby the latter may be rotated independently of the gear when angular adjustment is to be effected. However, there is keyed to the shaft a carrier member which supports at circumferentially spaced points one or more pinions which mesh with the driving gear. The pinion carrier is capable of limited axial movement with respect to the shaft, and the pinion and gear both have meshing spiral or angular teeth.

Means are provided for manually locking the pinion against rotation with respect to the carrier and releasing it from such locked condition. The arrangement is thus such that when the pinion is locked and the carrier is moved axially with respect to the shaft, the relative movement of the meshing spiral or angled teeth of the pinion and gear causes relative rotary movement of the carrier, which is keyed to the shaft, and the driving gear which is in driving engagement with the driving train leading from the prime mover of the machine. Thus angular shifting of the shaft and the operative instrumentality carried thereby with respect to any other operative member driven in close mesh with the transmission from the common source of power, is attained.

Of course the means for axially shifting the pinion carrier with respect to the rotating shaft must have a fulcrum or steady-rest, and it is a further object of the invention to conveniently and economically combine with this feature, the device for attaining the axial adjustment of the shaft.

Other objects and features of novelty will be understood from a perusal of the following specification taken in connection with the accompanying drawings in which one embodiment of the invention is illustrated by way of example.

Figure 1:
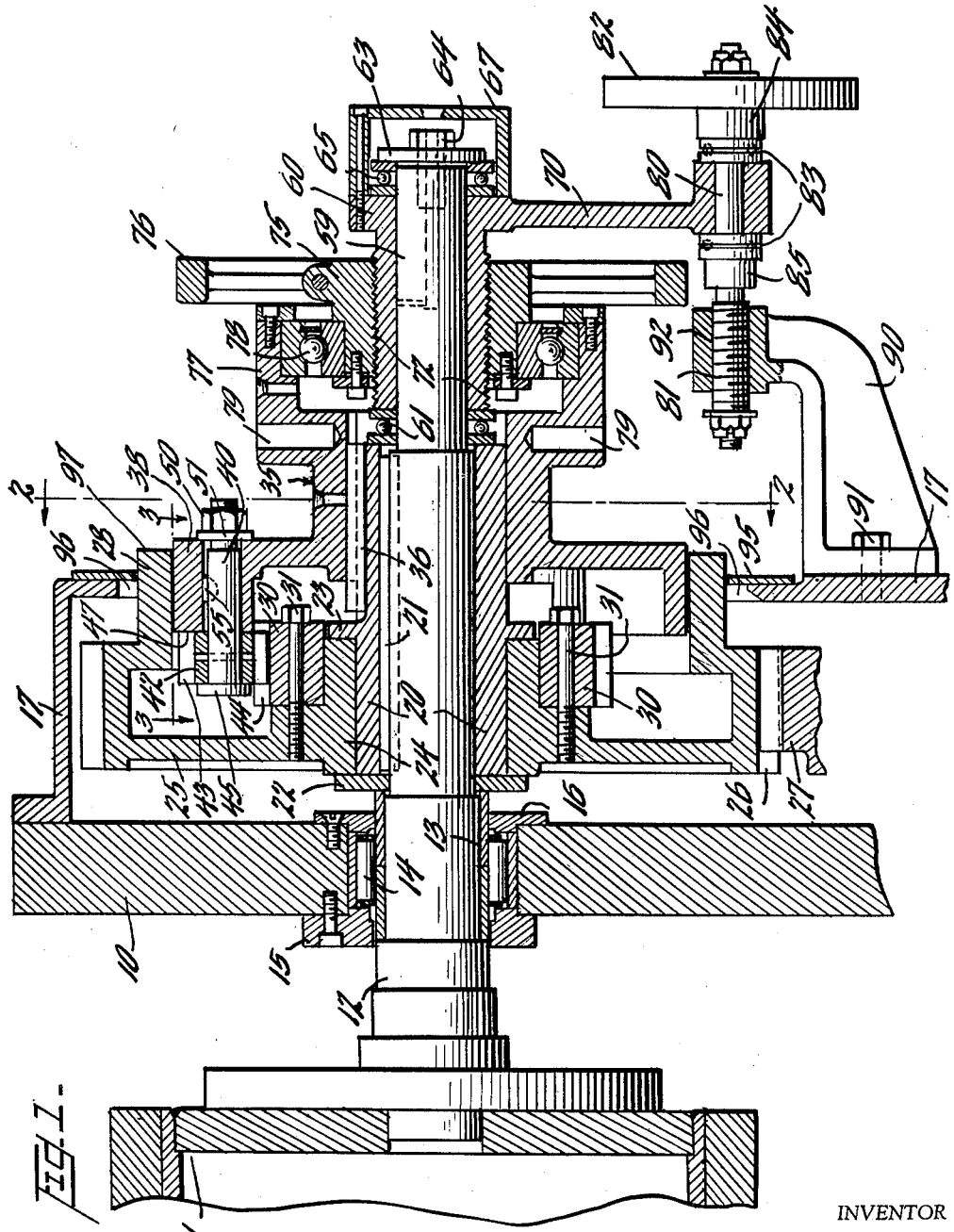
Figure 1 is a view in vertical section taken axially of the operating roll or cylinder which is to be adjusted.

The illustrative application of the principles of the invention is shown in the drawings as involving a well-known printer-slotter machine by which carton blanks or other articles to be made from cardboard or corrugated board are cut, slotted, and imprinted with signs, labels or other intelligence, preferably in two or more different colors. The necessity for adjustment of the angular and axial positions of the slotter rolls and printing rolls or impression rollers, in such a machine is obvious. The multi-color printing must not only register properly to form the complete label or design, but the printed area must be uniformly spaced from the slots or marginal portions of the blanks passing through the machine.

In Figure 1 of the drawings, a portion of the side frame of the printer-slotter is indicated at 10 and the roll 11 may be either the slotter roll, the printing roll, or an impression cylinder, this rotary member being rigidly carried upon the shaft 12. The shaft 12 is preferably provided with a bearing sleeve or bushing 13 disposed for rotation and limited axial movement within the anti-friction bearings 14, these bearings being secured in any suitable way, such as by means of the rings and plates 15 and 16, to the frame 10.

A supplemental frame or housing is rigidly secured to the side frame member 10 and comprises the casing 17 which surrounds a portion of the driving and adjusting means for the shaft 12.

The outer end of the shaft 12 projects from the side wall portion 10 and upon the extended part of the shaft there is keyed a substantially cylindrical hub member 20, the key or spline connection being shown at 21. A ring or washer 22 surrounds the shaft and serves to separate the hub 20 from the bearing bushing 13 and also to provide a retaining and guiding flange which cooperates with the integral flange 23 on the hub to receive the radially inward portion 24 of the driving gear 25. The driving gear in this particular embodiment of the invention is an externally toothed gear, the teeth 26 of which mesh with the teeth of a drive pinion 27 which comprises part of the transmission from the prime mover which runs the machine. Preferably the gear 25 is of hollow construction and is provided with an annular axially extended flange 28, the purpose of which will be presently described. Within a shouldered portion of the hub of the gear 25 there is fixed a ring gear 30 as by means of the bolts 31.

A flanged sleeve member 35 is splined as at 36 upon the outwardly projecting portion of the hub 20 so that the sleeve 35 may be moved axially of the hub and shaft. A flanged portion 38 of extended diameter is formed on the inward end of the sleeve 35, and at intervals around its circumference openings are provided for receiving the stub shafts or axles 40 of pinions 42, the teeth 43 of which mesh with the teeth 44 of the ring gear 30, these teeth being of angular or spiral configuration for a purpose to be later described. In the illustrated embodiment of the invention the stub shafts 40 are provided with heads 45 which serve to bind the pinions 42 against the outer surface 47 of the flange 38 of the sleeve 35, when the stub shafts 40 are drawn in a direction toward the right as viewed in Figure 1. The means for pulling on the stub shafts or axles 40 to effect this binding or locking of the pinions comprises in the illustrated embodiment the nut 50 beneath which may be inserted a washer 51.

The opening in the flange 38 and the stub shaft or axle 40 may be slotted and these parts keyed together as at 55 in order to hold the axle 40 from turning when the nut 50 is tightened.

The extreme outer end 59 of the shaft 12 is narrowed slightly and is rotatably disposed within the relatively stationary sleeve 60. Thrust bearings 61 are provided between the inner end of the fixed sleeve 60 and the hub member 20 and the end of the shaft 12 is provided with a clamping ring 63 held by the bolt 64 and serving to embrace the thrust bearing 65 disposed between the ring or plate 63 and the end of the relatively fixed sleeve 60. This end bearing structure may be covered and protected by a housing 67.

Projecting downwardly from the fixed sleeve 60 is an arm 70 which, by means to be presently described, is held in a relatively fixed position with relation to the frame of the machine.

The outer surface of the fixed sleeve 60 is provided with screw threads 72 and threaded upon this surface is a manipulating nut 75 which for convenience in rotating is provided with a hand wheel 76. An annular flange 77 extends outwardly from the adjustable sleeve 35 and surrounds a portion of the nut 75 and a combined thrust and radial bearing 78 is disposed between the overlapping portions of these two elements. Sockets 79 are provided in the sleeve 35 for the insertion of suitable tools for rotating the sleeve and the shaft in order to attain a coarse adjustment of the angular position as will be explained later on.

The downwardly extending fulcrum arm of the sleeve 60 within which the extension 59 of the shaft 12 rotates is provided with an opening at its lower end adapted to receive an adjusting shaft 80. This shaft carries upon its inner end a screw 81 and upon its outer end a manipulating hand wheel or knob 82. Thrust bearings 83 are disposed between the hub 84 of the wheel 82 and a shoulder or flange portion 85 formed or fixed upon the adjusting shaft 80 inwardly of the arm 70. A bracket 90 is fixed as by means of the bolts 91 to a portion of the housing 17 which is carried by the side frame 10. The bracket is provided with a threaded opening 92 into which the screw 81 is threaded and it will be readily seen that rotation of the wheel 82 will cause the arm 70 and the fixed sleeve 60 to move inwardly or outwardly axially of the shaft 12. Since the sleeve 60 is clamped upon the shaft extension 59 to prevent relative axial movement, the shaft and consequently the cylinder or operating member 11 will also be axially adjusted as the wheel 82 is rotated.

Figure 3:
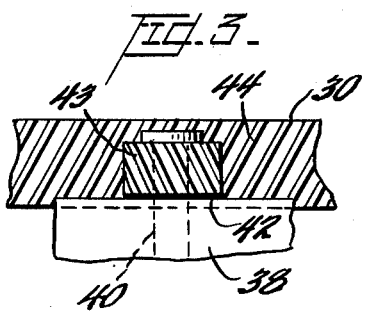
Figure 3 is a fragmentary detail view in plan of the adjustably meshing pinion and ring gears, taken on line 3—3 of Figure 1.

Returning now to the circumferential or angular relative adjustment of the shaft 12 with its operative element 11, with respect to the driving transmission represented by the driving gear 25, it will be seen from an inspection of Figure 3 of the drawings how the teeth 44 of the ring gear 30, which is fixed to the drive gear 25, are inclined, as are also the meshing teeth 43 on the pinions 42 carried upon the stub shafts 40. Now when the nut 50 is tightened upon the stub shaft or axle 40 the pinion 42 is clamped rigidly against rotation and thus the sleeve 35 which is fixed for unitary rotation with the shaft 12, also rotates as a unit with the drive wheel 25, even though the hub 24 of the driving gear is disposed between the flanges 22 and 23 for rotation upon the hub 20.

Now it will be readily seen that upon rotation of the hand wheel 76 and the adjusting nut member 75 the threaded engagement indicated at 72 will cause the nut 75 to move axially inwardly or outwardly upon the fixed sleeve 60, and by the bearing and supporting provisions already described, this adjustment can be made while the machine is in operation and while the shaft 12, the rotatable sleeve 35, the pinions 42, and the driving gear 25 are all rotated at the speeds required to accomplish the purpose of the machine. As the nut 75 and the sleeve 35 move inwardly or outwardly the pinions 42 move transversely with reference to the ring gear 30 and since the teeth 43 and 44 of the pinion and ring gear are inclined or spiral in configuration, there will ensue an angular relative adjusting movement between the pinion 42 and the ring gear 30. Since the pinions are locked, the nut 35 and the shaft 12 will also undergo an angular adjustment with relation to the drive gear 25 to which the ring gear 30 is rigidly connected. It will be noted that the ring gear 30 is approximately twice the width of the pinion 42 and the inclination of the meshing teeth may be made such that fine or vernier angular adjustment of the parts may be accomplished to the extent of say about an inch of the circumference of the ring gear, and this adjustment may be made as already explained during operation of the machine.

If a rotary or angular adjustment of considerable degree becomes necessary, then the nuts 50 on the stub axles 40 of the pinions 42 are loosened and the pinions 42 are then free to rotate upon their axles and to revolve around the ring gear 30. A spanner having jaws which fit the nuts 50 at one end, and a shank which fits within any of the openings 79 in the sleeve 35 at the other end, may be readily used in effecting the coarse adjustments. With the spanner or similar tool inserted in one of the openings 79 the sleeve 35 may be rotated freely with regard to the drive gear throughout its entire 360° of relative movement. When the desired coarse adjustment is made, the nuts 50 are again tightened to lock the pinions 42 in position, and any fine or vernier adjustment may be made by rotating the wheel 76 as has been described. A plate 95 may be secured to the housing or casing 17 around the opening 96 therein, the inner margins of this plate approaching the margin of the flanges 28 of the driving gear 25 very closely in order to exclude dust or foreign material from the housing.

Figure 2:
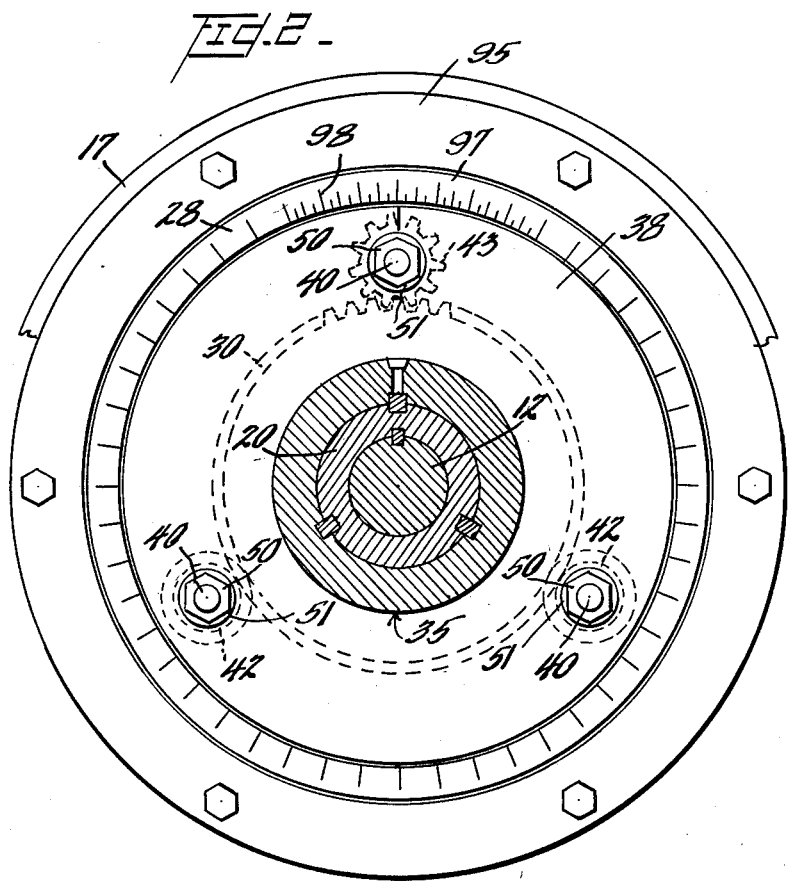
Figure 2 is a transverse vertical sectional view taken on line 2—2 of Figure 1.

Upon the outwardly extending face 97 of the annular flange 28 carried by the driving gear 28 are inscribed graduations for measuring the degree of adjustment to be attained, and on the closely adjacent edge of the flange 38 of the nut 35 there is inscribed a zero or lubber line to mate with the graduations on the flange 97. These graduations are shown at 98 in Figure 2 of the drawings.

It will be seen that by means of the present invention novel angular adjusting devices are provided for rotary operating members, all the parts of these devices being capable of being made upon simple standardized machines and eliminating difficultly machinable elements, such as for example internally toothed gears. Further, there has been accomplished by the provision of the present invention a unitary means for effecting axial adjustment of the operating member and for fulcruming the angular adjustment.

It is understood that various changes and alterations may be made in the embodiment of the invention illustrated and described herein without departing from the scope thereof as defined in the subjoined claims.

Having thus described the invention, what is claimed as new and desired to be secured by Letters Patent is:

1. In a shaft adjusting device of the class described, a supporting frame, a shaft supported for rotation in said frame, a driving gear journaled on said shaft, means for the transmission of power to said gear, means for adjusting said shaft angularly with respect to said gear, said means comprising a sleeve splined to said shaft for rotation therewith and axial adjustment movement with respect thereto, a ring gear fixed to said drive gear and disposed concentrically therewith, at least one pinion carried by said sleeve and meshing with said ring gear, the intermeshing teeth of both the pinion and the ring gear being transversely angled, means for locking said pinion against rotation relatively to said sleeve, means for axially adjusting said sleeve while said pinion is locked, whereby the wedging action of the angled teeth causes relative angular adjustment of the shaft with respect to the driving gear, said pinion being carried upon one end of a stub shaft which passes through an opening in a portion of said rotatable sleeve and has a clamping nut threaded upon its opposite end at the other side of said sleeve portion, whereby screwing said clamping nut home against the outer surface of the sleeve portion clamps the pinion firmly against the inner surface of said sleeve portion and locks it against rotation for effecting a fine angular adjustment of the shaft, while releasing the clamping nut frees the pinion for revolution about the ring gear for a rapid coarse rotary adjustment of the shaft.

2. In a shaft adjusting device of the class described, a supporting frame, a shaft supported for rotation in said frame, a driving gear journaled on said shaft, means for the transmission of power to said gear, means for adjusting said shaft angularly with respect to said gear, said means comprising a sleeve splined to said shaft for rotation therewith and axial adjustment movement with respect thereto, a ring gear fixed to said drive gear and disposed concentrically therewith, at least one pinion carried by said sleeve and meshing with said ring gear, the intermeshing teeth of both the pinion and the ring gear being transversely angled, means for locking said pinion against rotation relatively to said sleeve, means for axially adjusting said sleeve while said pinion is locked, whereby the wedging action of the angled teeth causes relative angular adjustment of the shaft with respect to the driving gear, said pinion being rotatably mounted upon one end of a stub shaft which passes through an opening in a portion of said rotatable sleeve and has a clamping nut threaded upon its opposite end at the other side of said sleeve portion, whereby screwing said clamping nut home against the outer surface of the sleeve portion clamps the pinion firmly against the inner surface of said sleeve portion and locks it against rotation for effecting a fine angular adjustment of the shaft, while releasing the clamping nut frees the pinion for revolution about the ring gear for a rapid coarse rotary adjustment of the shaft, and the stub shaft is keyed within said opening for facilitating rotation of the clamping nut relatively thereto.

3. In a shaft adjusting device of the class described, a supporting frame, a shaft supported for rotation in said frame, a driving gear journaled on said shaft, means for the transmission of power to said gear, means for adjusting said shaft angularly with respect to said gear, said means comprising a sleeve splined to said shaft for rotation therewith and axial adjustment movement with respect thereto, a ring gear fixed to said drive gear and disposed concentrically therewith, at least one pinion carried by said sleeve and meshing with said ring gear, the intermeshing teeth of both the pinion and the ring gear being transversely angled, means for locking said pinion against rotation relatively to said sleeve, means for axially adjusting said sleeve while said pinion is locked, whereby the wedging action of the angled teeth causes relative angular adjustment of the shaft with respect to the driving gear, said last named means comprising a sleeve which surrounds said shaft and is fixed against rotation, an adjusting nut threaded on said fixed sleeve for travel therealong as it is rotated, and a thrust bearing interposed between said nut and said first named rotatable sleeve.

4. In a shaft adjusting device of the class described, a supporting frame, a shaft supported for rotation in said frame, a driving gear journaled on said shaft, means for the transmission of power to said gear, means for adjusting said shaft angularly with respect to said gear, said means comprising a sleeve splined to said shaft for rotation therewith and axial adjustment movement with respect thereto, a ring gear fixed to said drive gear and disposed concentrically therewith, at least one pinion carried by said sleeve and meshing with said ring gear, the intermeshing teeth of both the pinion and the ring gear being transversely angled, means for locking said pinion against rotation relatively to said sleeve, means for axially adjusting said sleeve while said pinion is locked, whereby the wedging action of the angled teeth causes relative angular adjustment of the shaft with respect to the driving gear, said last named means comprising a sleeve which surrounds said shaft and is fixed against rotation and which is also fixed against axial movement with respect to said shaft, an adjusting nut threaded on said fixed sleeve for travel therealong as it is rotated, a hand wheel on said nut, and a thrust bearing interposed between said nut and said first named rotatable sleeve, an extension on said fixed sleeve and means bracing said extension against said supporting frame for preventing rotation of the sleeve.

5. In a shaft adjusting device of the class described, a supporting frame, a shaft supported for rotation in said frame, a driving gear journaled on said shaft, means for the transmission of power to said gear, means for adjusting said shaft angularly with respect to said gear, said means comprising a sleeve splined to said shaft for rotation therewith and axial adjustment movement with respect thereto, a ring gear fixed to said drive gear and disposed concentrically therewith, at least one pinion carried by said sleeve and meshing with said ring gear, the intermeshing teeth of both the pinion and the ring gear being transversely angled, means for locking said pinion against rotation relatively to said sleeve, means for axially adjusting said sleeve while said pinion is locked, whereby the wedging action of the angled teeth causes relative angular adjustment of the shaft with respect to the driving gear, said last named means comprising a sleeve which surrounds said shaft and is fixed against rotation and also fixed against axial movement with respect to said shaft, an adjusting nut threaded on said fixed sleeve for travel therealong as it is rotated, and a thrust bearing interposed between said nut and said first named rotatable sleeve, a radial extension on said fixed sleeve and means for connecting said radial extension to said supporting frame for locking it against rotation, said last named means being adjustable to move the fixed sleeve, and thus the shaft, axially.

6. In a shaft adjusting device of the class described, a supporting frame, a shaft supported for rotation in said frame, a driving gear journaled on said shaft, means for the transmission of power to said gear, means for adjusting said shaft angularly with respect to said gear, said means comprising a sleeve splined to said shaft for rotation therewith and axial adjustment movement with respect thereto, a ring gear fixed to said drive gear and disposed concentrically therewith, at least one pinion carried by said sleeve and meshing with said ring gear, the intermeshing teeth of both the pinion and the ring gear being transversely angled, means for locking said pinion against rotation relatively to said sleeve, means for axially adjusting said sleeve while said pinion is locked, whereby the wedging action of the angled teeth causes relative angular adjustment of the shaft with respect to the driving gear, said last named means comprising a sleeve which surrounds said shaft and is fixed against rotation, an adjusting nut threaded on said fixed sleeve for travel therealong as it is rotated, and a thrust bearing interposed between said nut and said first named rotatable sleeve, a radially extending arm on said fixed sleeve, a screw rotatable, but fixed axially, with respect to said arm, said screw being threaded into a fixed portion of the frame, and means for manipulating said screw to adjust the fixed sleeve and thus the shaft axially, while bracing said sleeve itself against rotation.

References Cited in the file of this patent

UNITED STATES PATENTS

| Number | Name | Date |
|---|---|---|
| 2,539,068 | Funk | Jan. 23, 1951 |